United States Patent
Erickson

Patent Number: 6,113,837
Date of Patent: Sep. 5, 2000

[54] METHOD OF FORMING PRODUCTS FROM THERMOFORMABLE FOAM WITH INFRARED RECEPTORS

[75] Inventor: Brian L. Erickson, Holland, Mich.

[73] Assignee: Johnson Controls Interiors Technology Corp., Holland, Mich.

[21] Appl. No.: 09/371,881

[22] Filed: Aug. 9, 1999

Related U.S. Application Data

[62] Division of application No. 08/976,996, Nov. 24, 1997, Pat. No. 5,981,611.

[51] Int. Cl.$^7$ ..................................................... B29C 51/42
[52] U.S. Cl. ........................... 264/413; 264/481; 264/492; 264/321
[58] Field of Search ..................................... 264/321, 413, 264/481, 492

[56] References Cited

U.S. PATENT DOCUMENTS

| | | | |
|---|---|---|---|
| 2,825,282 | 3/1958 | Gergen et al. | 101/401.3 |
| 3,066,211 | 11/1962 | Vogt | 219/34 |
| 3,251,911 | 5/1966 | Hansen | 264/25 |
| 3,265,785 | 8/1966 | Rainer | 264/45 |
| 3,384,691 | 5/1968 | Weissman et al. | 264/47 |
| 3,432,640 | 3/1969 | Shelby | 219/354 |
| 3,486,967 | 12/1969 | Fisher | 521/99 |
| 3,499,848 | 3/1970 | Weisman | 260/2.5 |
| 3,564,602 | 2/1971 | Peck | 264/45 |
| 3,635,874 | 1/1972 | Laur | 260/37 |
| 3,742,853 | 7/1973 | Landsman | 101/401.1 |
| 3,775,350 | 11/1973 | Juhas | 260/2.5 |
| 3,902,940 | 9/1975 | Heller, Jr. et al. | 156/79 |
| 3,999,918 | 12/1976 | Landsman | 425/174.4 |
| 4,067,765 | 1/1978 | Heller, Jr. et al. | 156/272 |
| 4,166,163 | 8/1979 | DiBella et al. | 521/920 |
| 4,211,848 | 7/1980 | Blount | 521/154 |
| 4,278,777 | 7/1981 | Chandalia et al. | 521/99 |
| 4,301,040 | 11/1981 | Berbeco | 252/511 |
| 4,505,973 | 3/1985 | Neet et al. | 428/317.9 |
| 4,535,118 | 8/1985 | Pengilly | 524/398 |
| 4,911,978 | 3/1990 | Tsubone et al. | 428/317.9 |
| 4,996,109 | 2/1991 | Krieg et al. | 428/304.4 |
| 5,192,607 | 3/1993 | Soukup | 428/314.4 |
| 5,288,549 | 2/1994 | Zeitler et al. | 428/318.6 |
| 5,373,026 | 12/1994 | Bartz et al. | 521/82 |
| 5,424,014 | 6/1995 | Glorioso et al. | 264/45.3 |
| 5,461,098 | 10/1995 | Hitchcock et al. | 524/297 |
| 5,468,432 | 11/1995 | Hurley et al. | 264/45.3 |

*Primary Examiner*—Allan R. Kuhns
*Attorney, Agent, or Firm*—Harness, Dickey & Pierce, P.L.C.

[57] ABSTRACT

A plastic sheet capable of being shaped by a cold room temperature tool, said sheet being a semi-rigid thermoformable plastic foam doped with carbon black having a concentration within a range of 0.0000081 to 0.0081% by weight of the foam. And a method of forming a product from such sheet by heating it to its thermoforming temperature range by infrared (IR) heat and placing and compressing the sheet between mold parts of a cold tool, the IR heat preferably being generated by quartz lamp electric heaters.

14 Claims, 7 Drawing Sheets

METHOD OF FORMING PRODUCTS FROM THERMOFORMABLE FOAM WITH INFRARED RECEPTORS

This is a divisional application of U.S. patent application Ser. No. 08/976,996, filed on Nov. 24, 1997, now U.S. Pat. No. 5,981,611 entitled "THERMOFORMABLE FOAM WITH INFRARED RECEPTORS."

BACKGROUND OF THE INVENTION

This invention relates generally to a plastic sheet capable of being shaped by a cold tool into a product by interposing and compressing the sheet between two mold parts. More specifically, this invention relates to a semi-rigid thermoformable foam with infrared receptors and to the method of shaping a sheet of such foam after heating the same to its thermoforming softening temperature.

For some time, sheets of semi-rigid thermoformable sheets of polyurethane foam has been used for core material on various types of products such as headliners and visors utilized in automotive vehicles. The foam is processed in a slab form and slit into sheets by the plastic supplier. The foam is then heated to its thermoforming temperature prior to forming it to shape in a cold tool, generally at room temperature for forming the products. The semi-rigid polyurethane foam has a thermoforming temperature range at which it is necessary to heat the sheet prior to placing the sheet between the mold parts of the forming tool. It is desired that the foam exhibit desired processing properties of fast heating, uniform temperature distribution, and slow cooling. Heretofore, the polyurethane foam utilized has exhibited the desired properties of uniform temperature distribution and slow cooling. However, the time required to heat both the surfaces and core of the sheets of polyurethane foam has been undesirable because of the time consumed in such heating, making it inefficient and thus costly to shape the foam into the desired product. Therefore, this time problem has created the necessity for some way to decrease the heating time of the polyurethane foam sheet.

SUMMARY OF THE INVENTION

In view of the foregoing background, an object of my invention is to provide an economical and highly efficient novel method of heat-forming thermoformable plastic foam material to its thermoforming softening temperature by reducing the time interval required to heat the sheet of foam material throughout its entire thickness while at the same time providing uniform temperature distribution and slow cooling. The concept occurred to me that doping the foam with carbon black may possibly improve the heating rate versus the undoped foam. Experimentation was performed on a semi-rigid polyurethane thermoformable plastic foam material doped with carbon black by weight of various levels. More specifically, the semi-rigid polyurethane thermoformable plastic foam material utilized had a thermoforming softening temperature range of substantially between 250° F. to 320° F. My concept was that the carbon black particles would serve as infrared receptors to improve the heating rate of the foam sheet utilizing this concept. I discovered that high concentrations of carbon black greater than 0.00081% by weight reduced undesirable results while the range of 0.0000081 to 0.0081% by weight produced improvement in the heating rate versus the undoped foam sheet. Within this range of concentration the uniformity of heating from the surface to the core is still maintained. Preferably, however, I discovered that the range of concentration falling within 0.0000081 to 0.000081% by weight produced highly desirable results in the heating rate and that the foam sheet loaded with about 0.0000081% carbon black exhibited the best processing properties desired, i.e., fast heating, uniform temperature distribution, and slow cooling.

Having made the above discovery, it lead to the method of this invention, i.e., forming a product from a plastic sheet capable of being shaped by a cold room temperature tool by interposing and compressing the sheet as described above between two mold parts of the tool after heating of the sheet to its thermoforming temperature range by infrared (IR) heat preferably generated by quartz lamp electric heaters located on each side of the sheet.

For a better understanding of the invention, as well as other objects and further features thereof, reference made to the following detailed description made in conjunction with the accompanying drawings.

DETAILED DESCRIPTION OF PREFERRED EMBODIMENT

Figure 1:
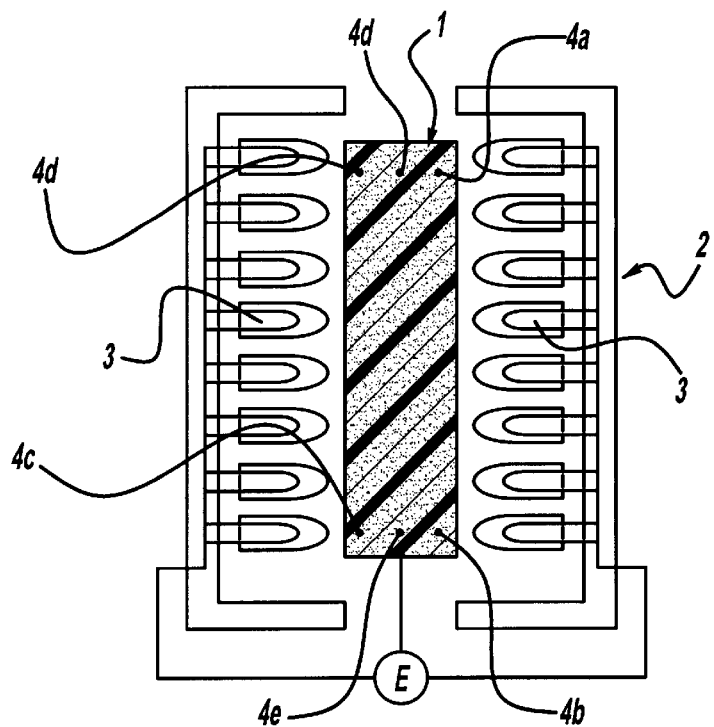
FIG. 1 is a sketch of the foam sheet of this invention being heated by quartz lamp electric heaters.

Referring to the drawings, reference numeral 1 designates a semi-rigid thermoformable foam sheet in which is incorporated carbon black particles within a selected percent (%) by weight of the foam polymer. The particles are represented by dots within the sheet. The range of concentration of the carbon black particles is critical to my invention since unpredicted and unusual results is obtained by such concentration as will be explained hereinafter in conjunction with the graphs of FIGS. 4–12 of the drawings.

The preferred material of foam sheet 1 is a closed cell, semi-rigid thermoformable polyurethane foam manufactured by Woodbridge Foam Corporation and identified as R.T. 2015 G.Y. However, it is believed that the present invention could be used with other equivalent materials which are to be heated by an infrared (IR) heat source. Further, although the tests conducted, as will be discussed hereinafter, have been on the foam sheet itself, the present invention could involve products with which a sheet of such foam is combined, such as foam backed vinyl.

Within the preferred form of this invention, the foam sheet I is thermoformable within the range of 250° F. to 320° F., although this invention may apply to foam in which the process temperature falls outside this range. This process temperature is frequently referred to as the process window which is the temperature needed to heat the foam in order for the material to be thermoformed, i.e., shaped into a specific part or product. Typical types of such products are utilized in the automotive industries, for example, the cores of sun visors, headliners, and the like. For example, U.S. patent Ser.

No. 08/661,819 filed on Jun. 11, 1997, and entitled VISOR AND METHOD OF MANUFACTURING discloses a visor formed from sheets of closed-cell, semi-rigid urethane material having a density of about 2.0 pounds per cubic foot. These sheets have been thermoformed together with support structure etc. to form a laminated visor body which may be subsequently mounted to a backbone assembly and to a pivot rod assembly. It is anticipated that the present invention can be practiced on foam having a greater density such as 1 to 4 pounds per cubic foot.

The preferred carbon black utilized in this invention is a furnace black although other types of carbon black can be used such as lamp black, channel black, oil furnace black, and the like. Carbon black utilized in this invention has a fineness or surface area of 25 square meters per gram. It is premixed as a concentrate in the polyol by a dispersing agent generally known as Rebus 2104. The concentration of carbon black preferably falls within the range of 0.0000081 to 0.00081% by weight of the foam. However, as will be disclosed and discussed above with relation to graphs of FIGS. 4–12, the range of 0.0000081 to 0.000081% by weight produces a better result and a percentage by weight of about 0.0000081% provides the optimum result.

FIG. 1 discloses a sketch of the apparatus utilized in experimentation performed on the foam sheet 1 having dimensions of 16 mm thick, 6 cm long, and 20 cm wide. Thermal couple probes 4a, 4b, 4c, 4d, 4e, and 4f were placed on the foam surface and also in the center of the foam thickness, i.e., the core. Using this technique it was possible to monitor and record the surface and core temperatures of the foam sheet as it was being heated by a G.M.T. 800 Beta built oven 2 manufactured by Extol Inc. This oven consists of quartz lamps 3 arranged vertically on each side of the foam sheet 1 so that the IR energy strikes the foam sheet on both sides. FIGS. 4–11 disclose time versus temperature charts for each of the percentage of carbon black by weight. The charts of FIGS. 4–11 disclose the medium time for the surfaces and the core of each sample to reach the process temperature or process window.

It should be understood that in heating the foam sheet there are three important criteria to be considered. The first is the heating rate which is extremely important to the cost of producing the final product from the foam sheet 1. The graphs show the medium time recorded by the probes 4a–4f for the surfaces and the core to reach the process temperature, that is, the time to reach the temperature at which the foam sheet 1 is thermoformable. The second criteria important for producing products from foam sheet as discussed above, is the uniformity of the temperature distribution. This is demonstrated by the distance between the lines representing the temperature of the core and the temperature of the surface. In other words, it is important that the core and the surface temperatures are not too far apart. The third important criteria is the cooling rate. It is important that the cooling rate for the surface and the core be gradual and substantially the same. This is demonstrated on the charts by the curves as the temperatures drop after the oven is shut off.

Figure 4:
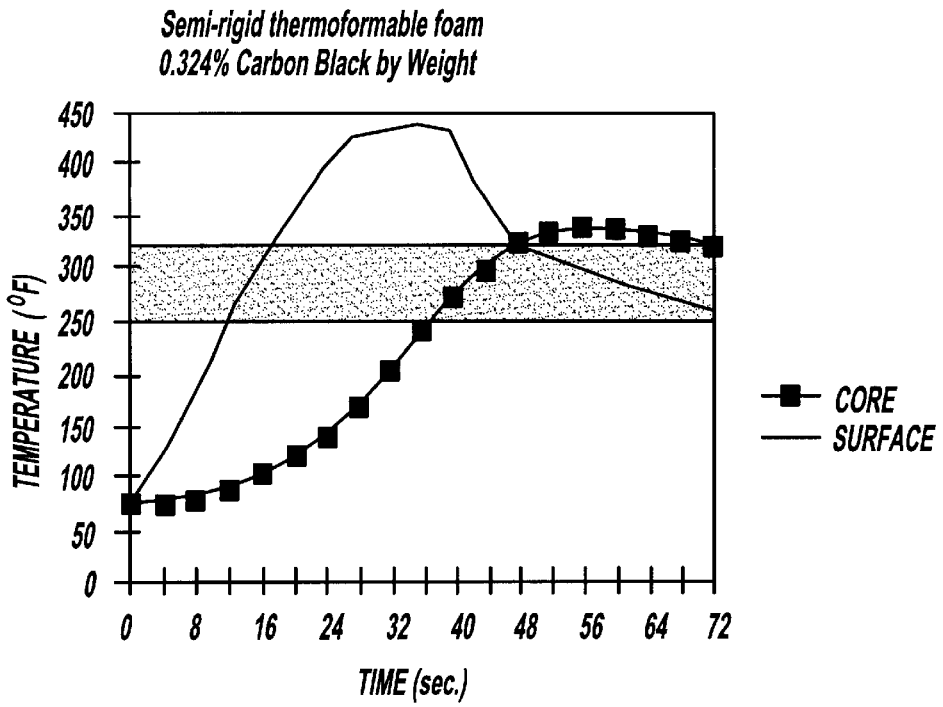
FIGS. 4–12 disclose graphs of tests made by heating with the apparatus of FIG. 1, semi-rigid thermoformable foam sheets having various concentrations of carbon black incorporated within the foam.

As previously stated, the charts of FIGS. 4–11 demonstrate the results from the various percentages of carbon black by weight of foam. FIG. 4 is a chart in which the sample examined is foam doped with 0.324% carbon black by weight. It should be noted that on this sample the surface heats much faster than the core which is believed to have been caused by the surface absorbing and blocking the IR energy. Since most of the energy is either absorbed or blocked at the surface, there is little energy left to heat the core. It will be noted that the core does not reach the process temperature of 250° F. until 36 seconds while the surface reaches this process temperature at approximately 12 seconds. Thus, the heating rate of the surface is too high. Also, the curves disclose a high cooling rate of the surface and the surface and core are never both within the same thermoforming temperature range at the same time. This means that the foam is never within the process window. It is also interesting to note the cooling rate of the surface after the oven is shut off (at about 36 seconds) is high since the heat energy is convecting away from the surface. The core, however, continues to heat even after the oven is shut off. This is due to heat conducting into the core from the surface. The combination of conduction and convection force the surface to cool rapidly. As previously explained, a fast cooling rate at the surface is not desirable since a high surface temperature is needed to activate the adhesives on the face coverings for many products such as headliners and visor applications. It will also be observed that the distance between the curves for the surface and the core are spread quite a distance and therefore, the uniform temperature distribution is poor.

Figure 5:
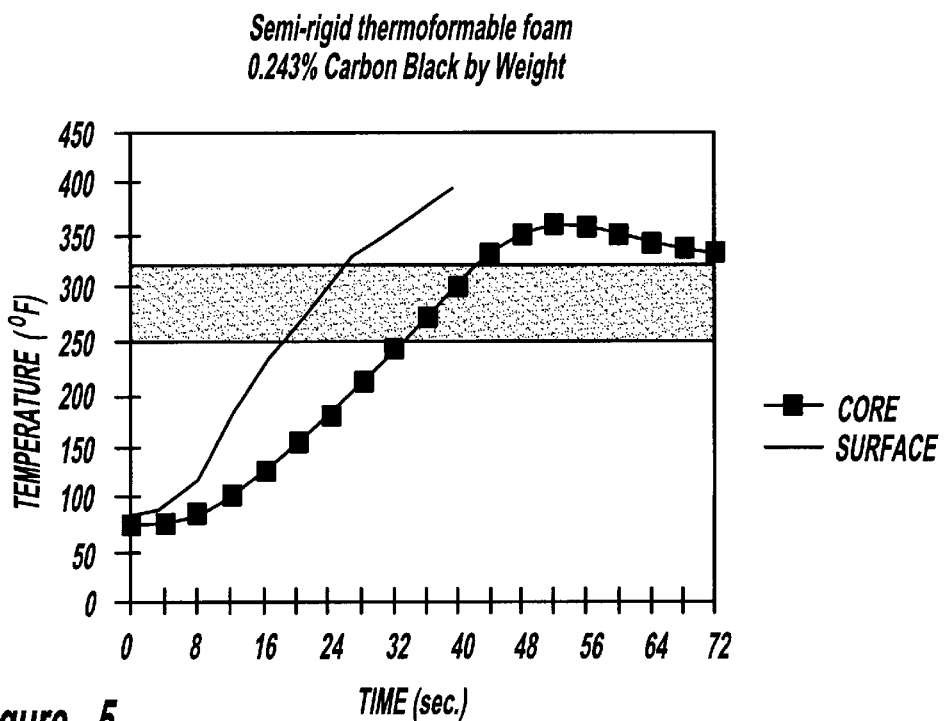

FIG. 5 shows a similar result for foam doped with 0.243% carbon black by weight although the recording of the surface temperature was not recorded to the shut off of the oven.

Figure 6:
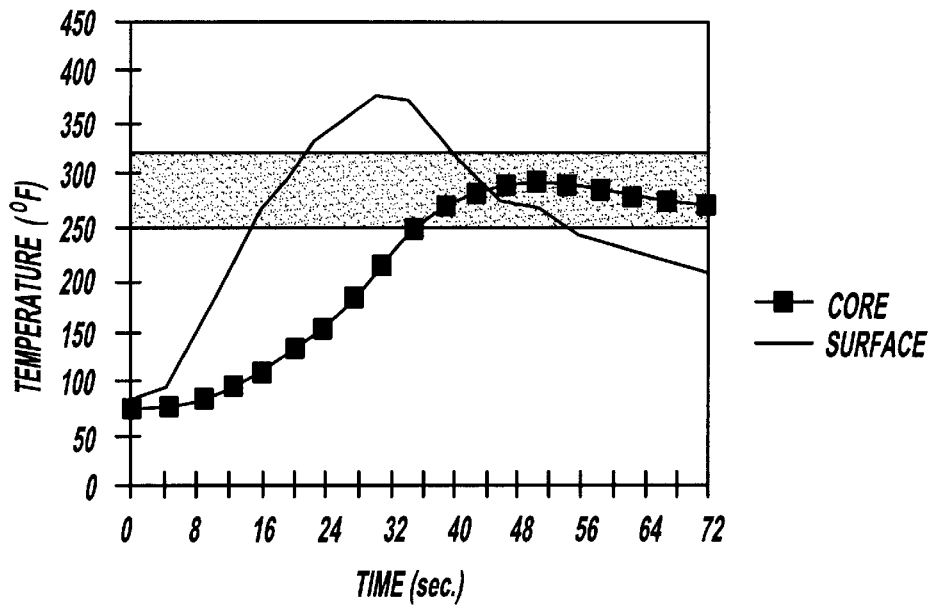
Figure 7:
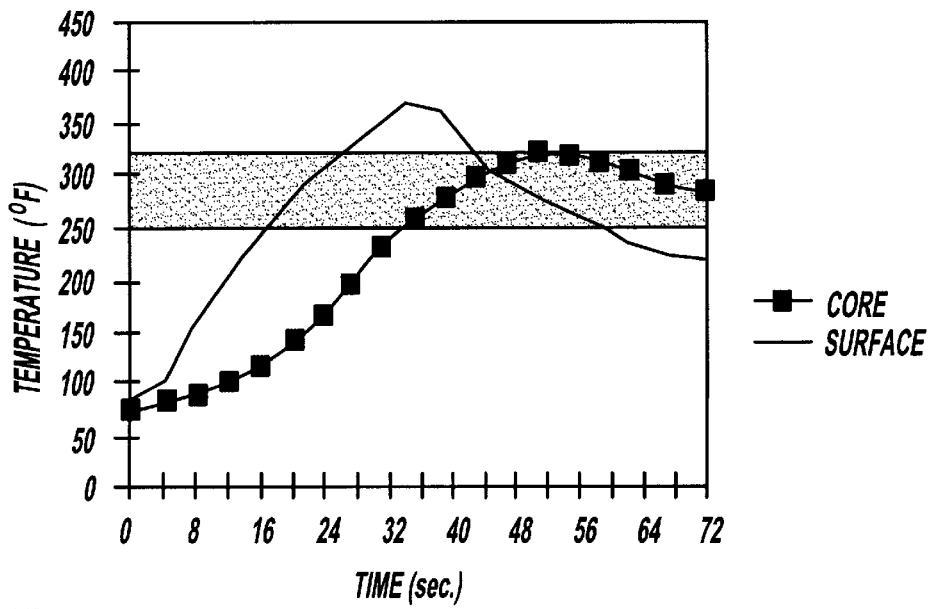

FIG. 6 discloses curves for foam doped with 0.162% carbon black in which the core again does not reach the process temperature until about 36 seconds which is unsatisfactory. Further, the surface temperatures drop at too high a cooling rate. This is also true of the chart of FIG. 7 showing temperature versus time curves for 0.081% carbon black by weight.

Figure 8:
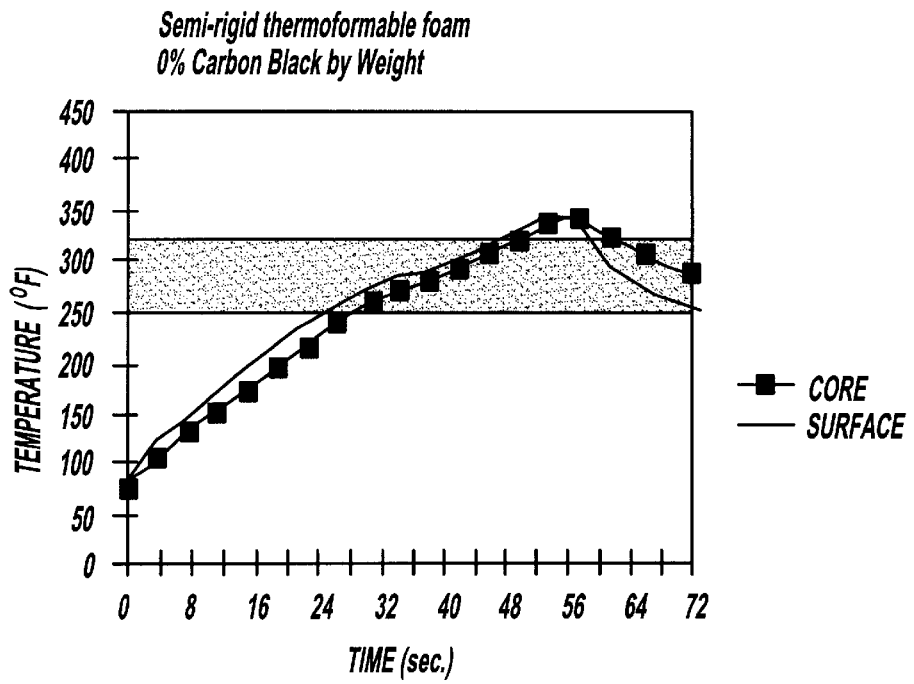

FIG. 8 discloses a sample examined with foam made without any carbon black loading. The time versus temperature chart for this materials shows that it takes approximately 30 seconds for the foam surface and core layers to both reach the minimum thermoforming temperature of 250° F. This chart of FIG. 8 shows a good uniform temperature distribution but the rate of heating both the core and the surface to the processing temperature between 250° F. and 320° F. takes approximately 30 seconds for the foam surface and core layers to both reach these temperatures. Thus it is desirable that the timing be decreased because of the time required to heat the sheet 1.

Figure 9:
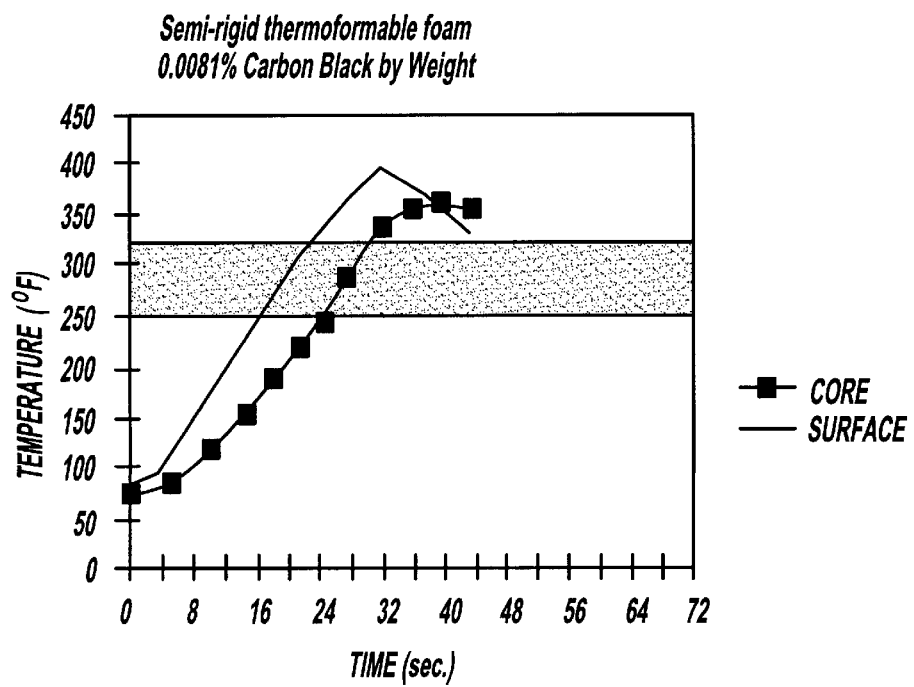
Figure 10:
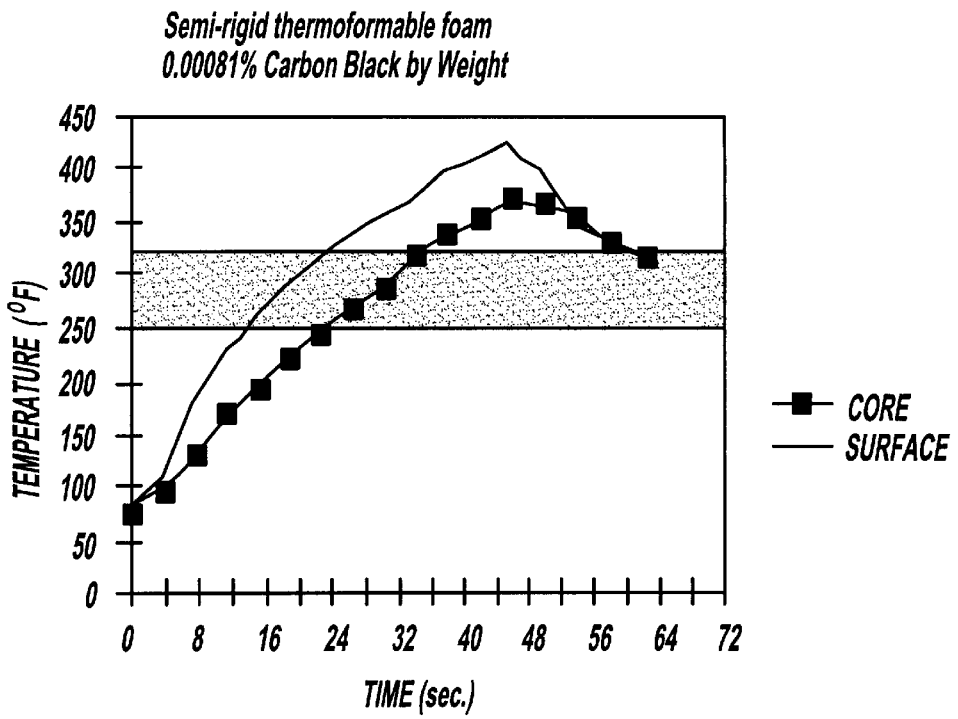

FIGS. 9 and 10 disclose charts for the surface and core utilizing 0.0081 and 0.00081%, respectively. This chart shows drastically improved times of approximately 24 seconds for the foam surface and core layers to both reach the minimum thermoforming temperature. This is a full 6 seconds faster than the undoped (0%) foam or a 20% improvement in heating rate versus the undoped foam. The uniformity of the heating from the surface to the core is still maintained at this loading level although it is not as uniform as the undoped (0%) foam. The uniformity of heating from the surface to the core is still maintained within an acceptable range at this loading level.

Figure 11:
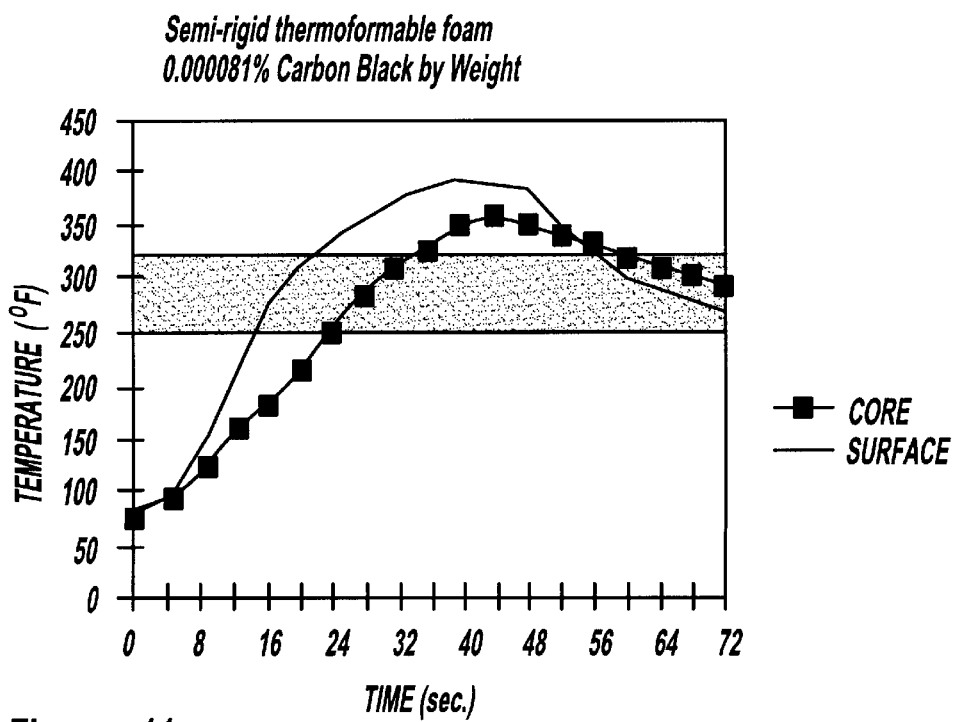
Figure 12:
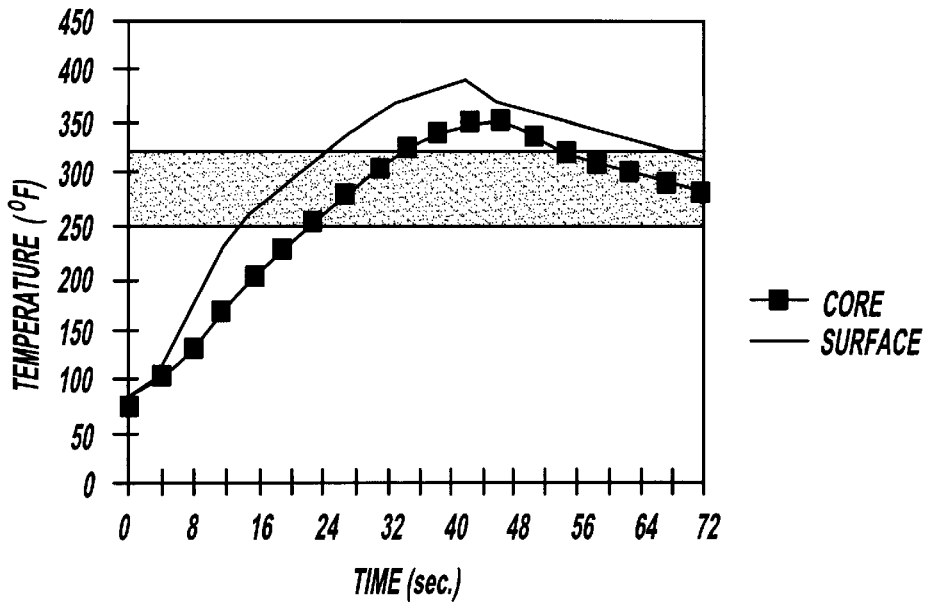

FIGS. 11 and 12 disclose charts showing curves for the surface and core utilizing samples of 0.000081% carbon black by weight and 0.0000081% carbon black by weight, respectively. Although these charts are somewhat similar, the 0.0000081% carbon black by weight exhibits the best processing properties desired, i.e., fast heating, uniform temperature distribution, and slow cooling. Therefore, a semi-rigid thermoformable foam with 0.0000081% carbon black by weight is the preferred concentration of carbon black.

Figure 14:
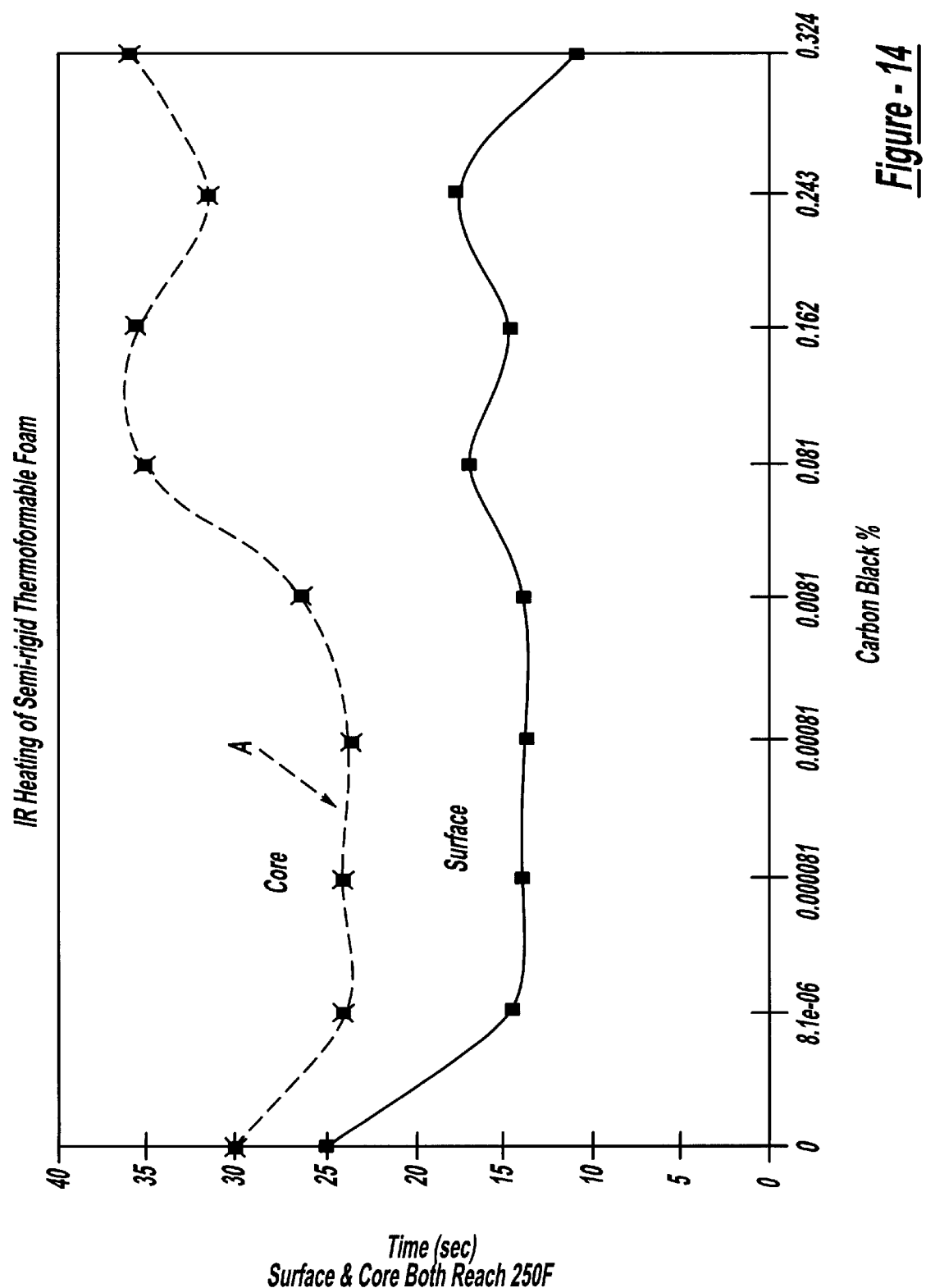
FIG. 14 is a graph disclosing the relative results of the graphs of FIGS. 4–12.

FIG. 14 discloses a chart made up from the curves of the charts of FIGS. 4–12. It discloses curves that disclose the time it takes for the various samples from 0 to 0.324% of carbon black by weight to reach the process window. It should be evident from this chart and from the above descriptions of the charts of FIGS. 4–11 that an unusual result is obtained by concentrations of 0.0000081% carbon black by weight to 0.0081% carbon black by weight. This is disclosed by the dwell "A" in the curve representing the time interval to heat both the surface and core to the process temperature of 250° F. as demonstrated by the curve designated as "core."

Figure 13:
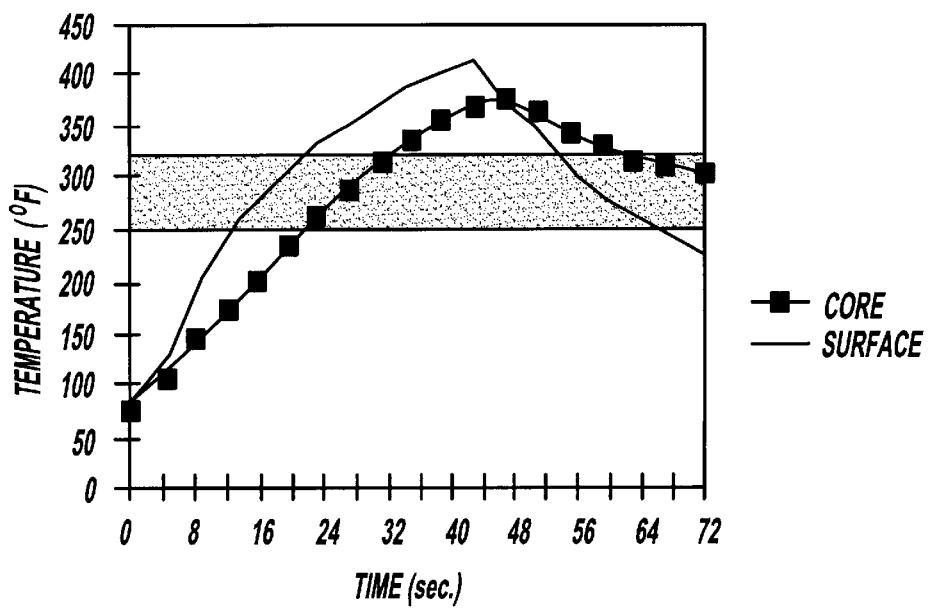
FIG. 13 is a graph disclosing a test made on a semi-rigid thermoformable foam in which a dye is added.

The foam loaded with 0.0000081% carbon black exhibited the processing properties desired, fast heating, uniform temperature distribution, and slow cooling. However, the color of the material was almost pure white. The foam used as headliners and visors is typically gray in color. The reason for this is that the trimmed edges of headliners are reviewed from within the vehicle or through the glass of the vehicle and in visors the gray color matches the fabric covering easier. Therefore, to accommodate this need, the foam is colored with a gray dye package. To ensure that the dye did not change the heating properties, samples were made and tested. The results can be seen in FIG. 13. It can be seen that the addition of the gray color package did not adversely affect the heating properties.

Figure 2:
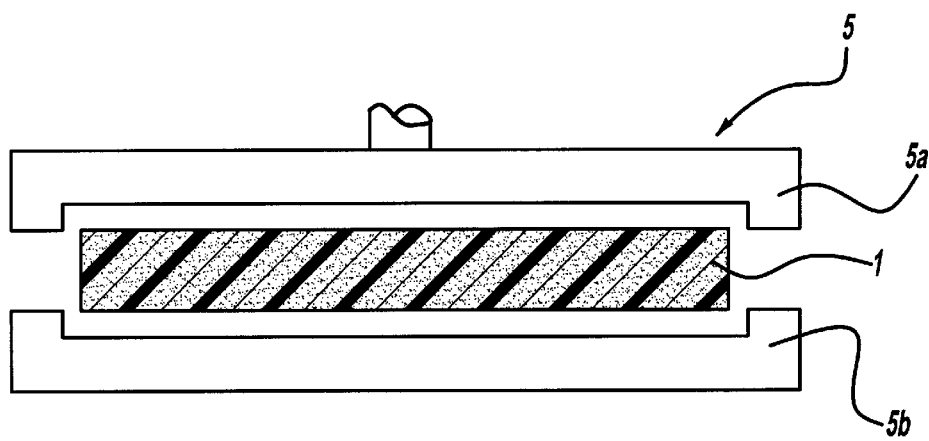
FIG. 2 is a sketch of the heated foam sheet being formed by a cold form tool.
Figure 3:
FIG. 3 is a flow diagram of the various steps to produce a product in accordance with this invention.

Although the crux of this invention resides in the concentration of carbon black by weight of the foam, it should be understood that this invention lead to the method of forming a product in which the carbon black impregnated foam sheet is utilized. As disclosed in FIG. 3, the method involves forming the sheet by the manufacturer of the foam in which carbon black is dispersed within range of concentration. These sheets are then supplied to the manufacture of the part utilizing the foam sheet such as the manufacturer of visors and headliners for automobiles. The foam sheet 1 is heated by the part manufacturer as above described by the infrared oven and then the sheet is shaped by the molding apparatus demonstrated by the sketch of FIG. 2.

The challenge in heating foam is that foam is an excellent insulator. It is typically easier to heat the outside layers of foam sheets than it is to transfer heat to the center or core of the material. To transfer energy to the foam and heat it, conduction heating, convection heating, or IR heating has been used.

Infrared heat has been typically used to heat foam sheets before they are formed into a particular product. The common IR sources used by many are gas fired IR heaters or electric heaters. Gas fired IR heaters have the advantage of being economical to run but are limited by slow response times that make them hard to control. Gas fired heaters also tend to have uneven heat distribution as the emitters get old. The IR efficiency of a gas fired heater is about 40%. This means that the available BTU's of heat from a gas fired heater source, 40% are radiantly transferred to the product while the remaining 60% are transferred by conduction and convection. Quartz lamp electric heaters have a much faster response time (fast heat up and cool down times) and are therefore much easier to control. The IR efficiency of quartz lamp electric heaters is about 86%. Note that this is much greater than the efficiency of gas fired heaters. IR heating is the most efficient way to transfer heat to a material and since quartz lamps have a radiant efficiency of about 86% in accordance with this invention I use quartz lamps 3 represented by the sketch thereof in FIG. 1.

In accordance with my method, after heating the foam slab or sheet, the sheet 1 is transferred to a molding machine 5 (FIG. 2) in which at least one of the parts 5a is movable with respect to the other part 5b. The mold part 5a is separated from the mold part 5b in order to receive the foam sheet or slab 1 between the two parts after which the mold part 5a is forced downwardly against the foam sheet 1 to give the foam sheet 1 its desired shape. Obviously, both parts 5a and 5b could be moved toward each other in the forming step.

From the preceding description of this invention, one skilled in the art can easily understand the essential characteristics of this invention, and without departing from the spirit and scope thereof, can make various changes and modifications of the invention to adapt it to various usages and conditions.

The invention claimed is:

1. A method of forming a product comprising:

providing a plastic sheet capable of being shaped by a cold room temperature tool into a product interposed and compressed between two mold parts of said tool, said sheet comprising:
a semi-rigid polyurethane thermoformable plastic foam material having a predetermined thermoforming softening temperature range;
said plastic sheet being doped with carbon black having a concentration within the range of 0.0000081 to 0.0081% by weight;
heating said sheet to said thermoforming temperature range by infrared (IR) heat; and
placing and compressing said sheet between mold parts of a cold tool.

2. A method of claim 1 in which the IR heat is generated by quartz lamp electric heaters.

3. A method of claim 2 in which the said quartz lamp electric heaters are located on each side of said sheet.

4. The method of claim 1 in which the concentrated percentage by weight of carbon black is within the range of 0.0000081 to 0.000081%.

5. The method of claim 1 in which the concentrated percentage by weight of carbon black is about 0.0000081%.

6. The method of claim 1 in which the plastic foam material is colored with a desired colored dye.

7. method of claim 1 in which the thermoforming range is 250° F. to 320° F.

8. The method of claim 7 in which the IR heat is generated by quartz lamp electric heaters.

9. The method of claim 7 in which the concentrated percentage by weight of carbon black is within the range of 0.0000081 to 0.000081%.

10. The method of claim 7 in which the concentrated percentage by weight of carbon black is about 0.0000081%.

11. The method of claim 7 in which the plastic foam material is colored with a desired colored dye.

12. The method of claim 8 in which the concentrated percentage by weight of carbon black is within the range of 0.0000081 to 0.000081%.

13. The method of claim 8 in which the concentrated percentage by weight of carbon black is about 0.0000081%.

14. The method of claim 8 in which the plastic foam material is colored with a desired colored dye.

* * * * *